US012756124B2

(12) United States Patent
Hirai

(10) Patent No.: US 12,756,124 B2
(45) Date of Patent: Oct. 6, 2026

(54) CONNECTOR INCLUDING LOCKING LANCE

(71) Applicant: SUMITOMO WIRING SYSTEMS, LTD., Mie (JP)

(72) Inventor: Kentaro Hirai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 326 days.

(21) Appl. No.: 18/434,095

(22) Filed: Feb. 6, 2024

(65) Prior Publication Data

US 2024/0283184 A1 Aug. 22, 2024

(30) Foreign Application Priority Data

Feb. 20, 2023 (JP) ................................ 2023-024136

(51) Int. Cl.
*H01R 13/422* (2006.01)

(52) U.S. Cl.
CPC ................................ *H01R 13/4223* (2013.01)

(58) Field of Classification Search
None
See application file for complete search history.

(56) References Cited

U.S. PATENT DOCUMENTS

| | | | | |
|---|---|---|---|---|
| 7,661,985 | B2 * | 2/2010 | Ishikawa | H01R 43/18 439/595 |
| 8,662,921 | B2 * | 3/2014 | Kataoka | H01R 13/443 439/587 |
| 10,644,427 | B2 * | 5/2020 | Matsuura | H01R 13/4223 |
| 2001/0002347 | A1 | 5/2001 | Yoshida et al. | |
| 2005/0170702 | A1 | 8/2005 | Ishikawa | |
| 2020/0203875 | A1 | 6/2020 | Tsutsui | |
| 2021/0408713 | A1 * | 12/2021 | Kida | H01R 13/4223 |

FOREIGN PATENT DOCUMENTS

| | | | |
|---|---|---|---|
| JP | 2018-206512 | A | 12/2018 |
| JP | 2021-018907 | A | 2/2021 |

* cited by examiner

*Primary Examiner* — Tho D Ta
(74) *Attorney, Agent, or Firm* — Venjuris, P.C.

(57) ABSTRACT

A housing 20 includes a locking lance 25 projecting forward from the inner surface of a cavity 22 and configured to lock a terminal fitting 60 from behind be able to retain the terminal fitting 60, and a wall surface part 41 to be arranged below the locking lance 25. The locking lance 25 includes, for example, a corner part 37 as a deformation inducing portion, which induces upward bending if a force for moving the terminal fitting 60 rearward is applied, on a facing surface 33 facing the wall surface part 41.

7 Claims, 7 Drawing Sheets

CONNECTOR INCLUDING LOCKING LANCE

CROSS-REFERENCE TO RELATED APPLICATIONS

This application is based on and claims priority from Japanese Patent Application No. 2023-024136, filed on Feb. 20, 2023, with the Japan Patent Office, the disclosure of which is incorporated herein in its entirety by reference.

TECHNICAL FIELD

The present disclosure relates to a connector.

BACKGROUND

A connector disclosed in Japanese Patent Laid-open Publication No. 2001-155810 is provided with a housing including a terminal accommodation chamber (hereinafter, a cavity) and a connection terminal (hereinafter, a terminal fitting) to be accommodated into the cavity. The housing includes a locking lance projecting forward from the inner surface of the cavity. The locking lance is resiliently deformable and locks the terminal fitting from behind to be able to retain the terminal fitting. The terminal fitting is connected to an end part of a coated wire (hereinafter, a wire). The wire is pulled out rearward from the housing. A connector including a locking lance of this type is also disclosed in Japanese Patent Laid-open Publication Nos. 2005-216810, 2018-206512, 2020-102338, 2021-018907 and 2022-007492.

SUMMARY

If a terminal fitting 60A moves rearward in a direction of an arrow as shown in FIGS. 7 and 8, such as when a wire pulled out from a housing is pulled rearward, a locking lance 25A is pressed by the terminal fitting 60A moving rearward and may be deformed into a V shape in a side view. Note that FIGS. 7 and 8 are schematic diagrams and do not show an actual form.

Here, the locking lance 25A can take either one of a first deformation mode to bring a bent part located at a center of the V shape toward the terminal fitting 60A (see FIG. 7) and a second deformation mode to bring the bent part away from the terminal fitting 60A (see FIG. 8). In the case of the first deformation mode, the locking lance 25A strongly contacts the terminal fitting 60A and any further deformation can be restricted. Thus, a rearward movement of the terminal fitting 60A can be suppressed. In contrast, in the case of the second deformation mode, the deformation of the locking lance 25A cannot be restricted. Thus, there has been a concern that a rearward movement of the terminal fitting 60A cannot be suppressed. Particularly, if a connector is reduced in size, the locking lance 25A is also reduced in size. Thus, there has been a problem that it is difficult for the locking lance 25A in the second deformation mode to obtain a holding force for the terminal fitting 60A.

Accordingly, the present disclosure aims to provide a technique capable of ensuring a holding force of a locking lance for a terminal fitting even if a connector is reduced in size.

The present disclosure is directed to a connector with a housing including a cavity and a terminal fitting to be arranged inside the cavity, the housing including a locking lance projecting forward from an inner surface of the cavity, the locking lance locking the terminal fitting from behind to be able to retain the terminal fitting, the housing including a wall surface part below the locking lance if a resiliently deforming side of the locking lance pressed by the terminal fitting in an insertion process into the cavity is a lower side, and the locking lance including a deformation inducing portion on a facing surface facing the wall surface part, the deformation inducing portion inducing upward bending if a force for moving the terminal fitting rearward is applied.

According to the present disclosure, it is possible to provide a technique capable of ensuring a holding force of a locking lance for a terminal fitting even if a connector is reduced in size.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
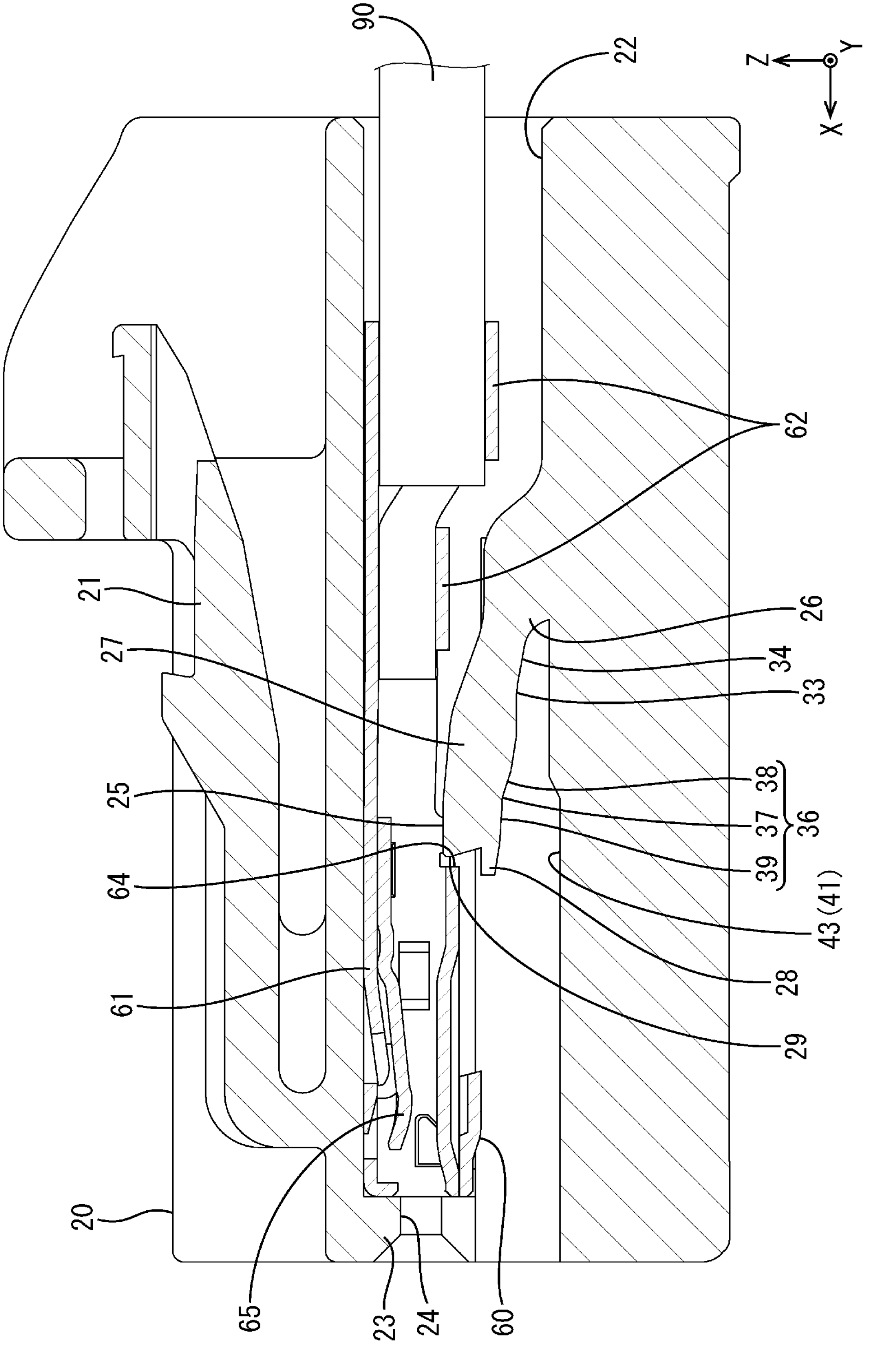
FIG. 1 is a side view in section of a connector in one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

DESCRIPTION OF EMBODIMENTS OF PRESENT DISCLOSURE

First, embodiments of the present disclosure are listed and described.

(1) The connector of the present disclosure is provided with a housing including a cavity and a terminal fitting to be arranged inside the cavity, the housing including a locking lance projecting forward from an inner surface of the cavity, the locking lance locking the terminal fitting from behind to be able to retain the terminal fitting, the housing including a wall surface part below the locking lance if a resiliently deforming side of the locking lance pressed by the terminal fitting in an insertion process into the cavity is a lower side, and the locking lance including a deformation inducing portion on a facing surface facing the wall surface part, the deformation inducing portion inducing upward bending if a force for moving the terminal fitting rearward is applied.

According to the above configuration, if a force for moving the terminal fitting rearward is applied, the deformation inducing portion can induce upward (toward the terminal fitting) deformation of the locking lance and the locking lance is restricted from being deformed any further by strongly contacting the terminal fitting. Thus, a rearward movement of the terminal fitting is suppressed. In the above configuration, the deformation of the locking lance toward the terminal fitting is induced and, conversely, the deformation of the locking lance toward the wall surface part is restricted by the deformation inducing portion. Thus, the above configuration can avoid a situation where a holding force of the locking lance for the terminal fitting is reduced by the deformation of the locking lance toward the wall surface part. As a result, the above configuration can ensure the holding force of the locking lance for the terminal fitting even if the connector is reduced in size.

(2) In the connector of (1) described above, preferably, the locking lance includes a recess in the facing surface, and the deformation inducing portion is shaped to linearly extend in a width direction orthogonal to a resilient deformation direction of the locking lance on a back side of the recess.

The above configuration enables the deformation inducing portion to be easily provided without specially processing the facing surface of the locking lance.

(3) In the connector of (2) described above, preferably, the recess is provided over an entire region in the width direction in the facing surface, and the deformation inducing portion linearly extends over the entire region in the width direction in the facing surface.

The above configuration can enhance the reliability of the deformation inducing portion to induce the deformation of the locking lance toward the terminal fitting.

(4) In the connector of (2) or (3) described above, preferably, an inner angle of a corner part formed on the back side of the recess is 150° or larger and 170° or smaller.

If the inner angle of the corner part of the recess is smaller than 150°, it becomes difficult to ensure the strength of the locking lance. If the inner angle of the corner part of the recess is larger than 170°, the deformation of the locking lance toward the terminal fitting may not be induced. In that respect, since the inner angle of the corner part is 150° or larger and 170° or smaller in the above configuration, the deformation of the locking lance toward the terminal fitting can be reliably induced while ensuring the strength of the locking lance.

(5) In the connector of any one of (2) to (4) described above, the wall surface part may include a tip side wall surface part facing a front end side of the locking lance and a base end side wall surface part arranged at a position closer to the facing surface than the tip side wall surface part and facing a rear end side of the locking lance, the recess may include a corner part formed on the back side of the recess, a front side part arranged in front of the corner part and a rear side part arranged behind the corner part, and the base end side wall surface part may be contactable with and facing the rear side part.

In the above configuration, excessive deflection of the locking lance toward the wall surface part can be restricted by the contact of the rear side part of the recess of the locking lance with the base end side wall surface part at the position closer to the facing surface than the tip side wall surface part. By the contact of the rear side part of the locking lance with the base end side wall surface part, the contact position of the locking lance with the wall surface part (base end side wall surface part) can be brought closer to the locking lance and, accordingly, a height (dimension in a height direction orthogonal to the width direction and a front-rear direction) of the housing can be suppressed to be small.

DETAILS OF EMBODIMENT OF PRESENT DISCLOSURE

A specific example of the present disclosure is described below with reference to the drawings. Note that the present invention is not limited to this illustration, but is represented by claims and intended to include all changes in the scope of claims and in the meaning and scope of equivalents.

Embodiment

A connector 10 according to one embodiment is provided with a housing 20 and terminal fittings 60 to be accommodated into the housing 20 as shown in FIG. 1. The housing 20 is connectable to an unillustrated mating connector. Note that, in the following description, a side of the housing 20 to be connected to the mating connector is referred to as a front side concerning a front-rear direction. A vertical direction is based on a vertical direction of FIG. 1. A lateral direction is based on a lateral direction of FIG. 4. In this specification, the vertical direction and lateral direction are respectively synonymous with a height direction and a width direction. Front, right and upper sides are respectively indicated by arrows X, Y and Z in FIG. 1. These directions do not necessarily coincide with directions in a state where the connector 10 is installed in an unillustrated vehicle or the like. For example, a lower side is not necessarily limited to a lower side in a direction of gravity.

(Terminal Fitting 60)

The terminal fitting 60 is integrally formed, such as by bending an electrically conductive metal plate. As shown in FIG. 1, the terminal fitting 60 includes a tubular connecting portion 61 and a barrel-shaped barrel portion 62 arranged behind the connecting portion 61. A resilient contact piece 65 to be brought into electrical contact with a tab of an unillustrated mating terminal fitting is provided inside the connecting portion 61. A locked portion 64 is provided on an edge part of a lower end side of a rear part of the connecting portion 61. The barrel portion 62 is electrically and mechanically connected to an end part of a wire 90 (coated wire). The connecting portion 61 includes an unillustrated stabilizer projecting downward on a right side wall part. The stabilizer has a function of guiding an inserting operation of the terminal fitting 60 into the housing 20 and restricting erroneous insertion of the terminal fitting 60 into the housing 20.

(Housing 20)

The housing 20 is made of synthetic resin and has a flat shape extending in the lateral direction as a whole. The housing 20 includes a resiliently deformable lock arm 21 projecting in a lateral central part of an upper surface. The lock arm 21 has a function of holding the housing 20 and the mating connector in a connected state by locking the mating connector.

The housing 20 includes a plurality of cavities 22 (only one is shown in FIG. 1). As shown in FIG. 1, the cavity 22 extends in the front-rear direction in the housing 20 and is open in the rear surface of the housing 20. A front wall 23 is provided on the front surface of the housing 20. The housing 20 includes a plurality of tab insertion openings 24 penetrating through the front wall 23 in the front-rear direction (penetration direction through the front wall 23). The tab insertion opening 24 communicates with the cavity 22. The tab of the mating terminal fitting is inserted into the cavity 22 through the tab insertion opening 24.

The housing 20 includes a locking lance 25 for each cavity 22. The locking lance 25 is cantilevered to project into the cavity 22 from the inner lower surface of the cavity 22 in the housing 20. The locking lance 25 has a function of restricting the terminal fitting 60 from coming out rearward from the cavity 22 by locking the terminal fitting 60.

Figure 2:
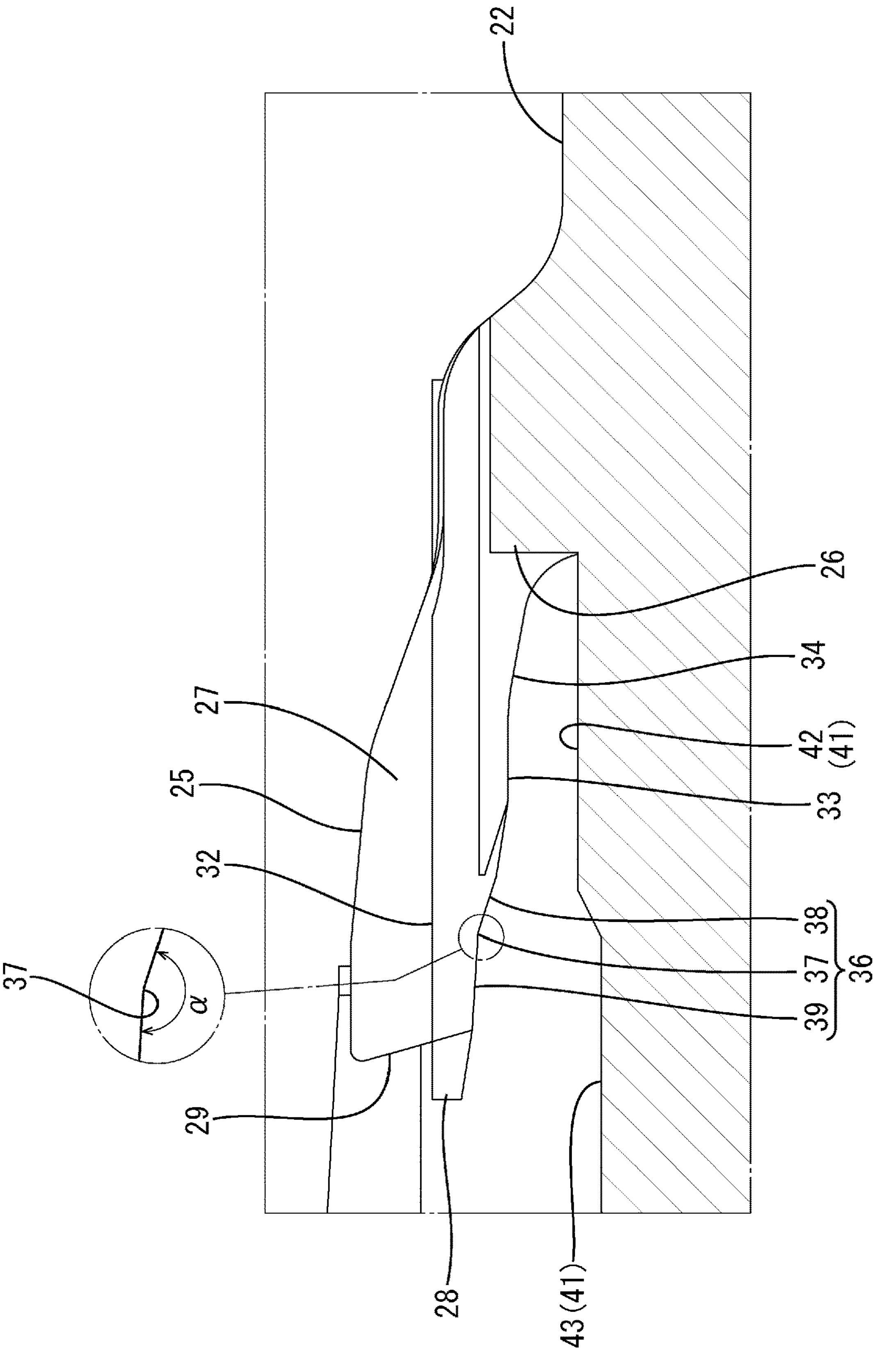
FIG. 2 is a side view enlargedly showing a locking lance projecting into a cavity of a housing.

Specifically, as shown in FIGS. 1 and 2, the locking lance 25 includes a base end portion 26 projecting on the inner lower surface of the cavity 22, an extending portion 27 extending forward from the base end portion 26 and a projecting portion 28 protruding forward from a lower end side of the front surface of the extending portion 27. The locking lance 25 is resiliently deformable in the vertical direction with the base end portion 26 as a fulcrum.

The upper surface of the extending portion 27 is arranged to extend obliquely upward toward a front side. The front surface of the extending portion 27 serves as an overhanging locking portion 29 inclined forward toward an upper side. The locking portion 29 can lock the locked portion 64 of the terminal fitting 60.

Figure 4:
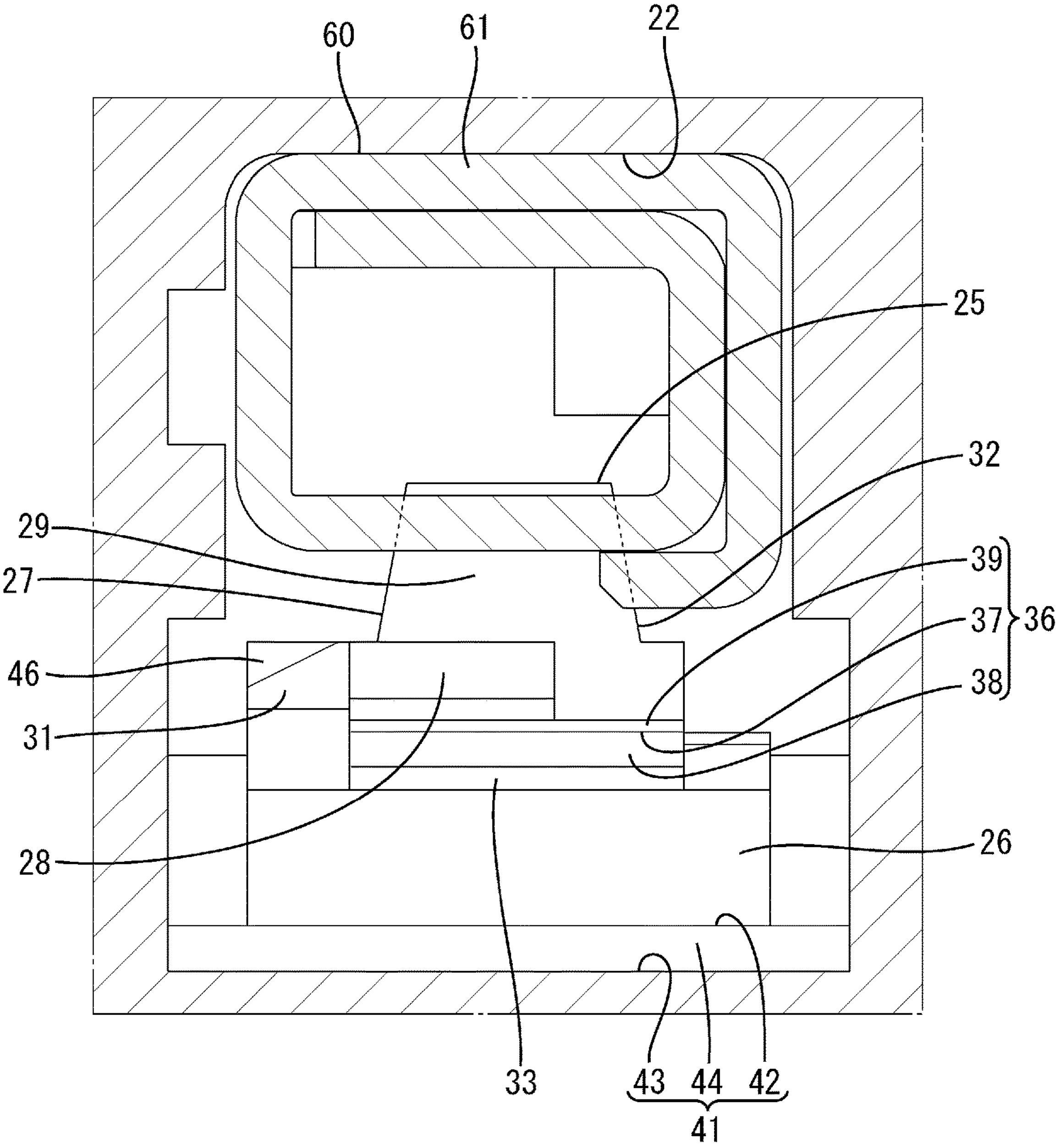
FIG. 4 is a front view in section showing the locking lance locking a terminal fitting inserted into the cavity of the housing.

The projecting portion 28 is in the form of a plate piece and projects from a left end part on the lower end side of the front surface of the extending portion 27 as shown in FIG. 4. As shown in FIG. 1, the upper surface of the projecting portion 28 is formed to be flat along the front-rear direction and lateral direction, and arranged to be contactable with and face the lower surface of the connecting portion 61 of the terminal fitting 60.

Figure 3:
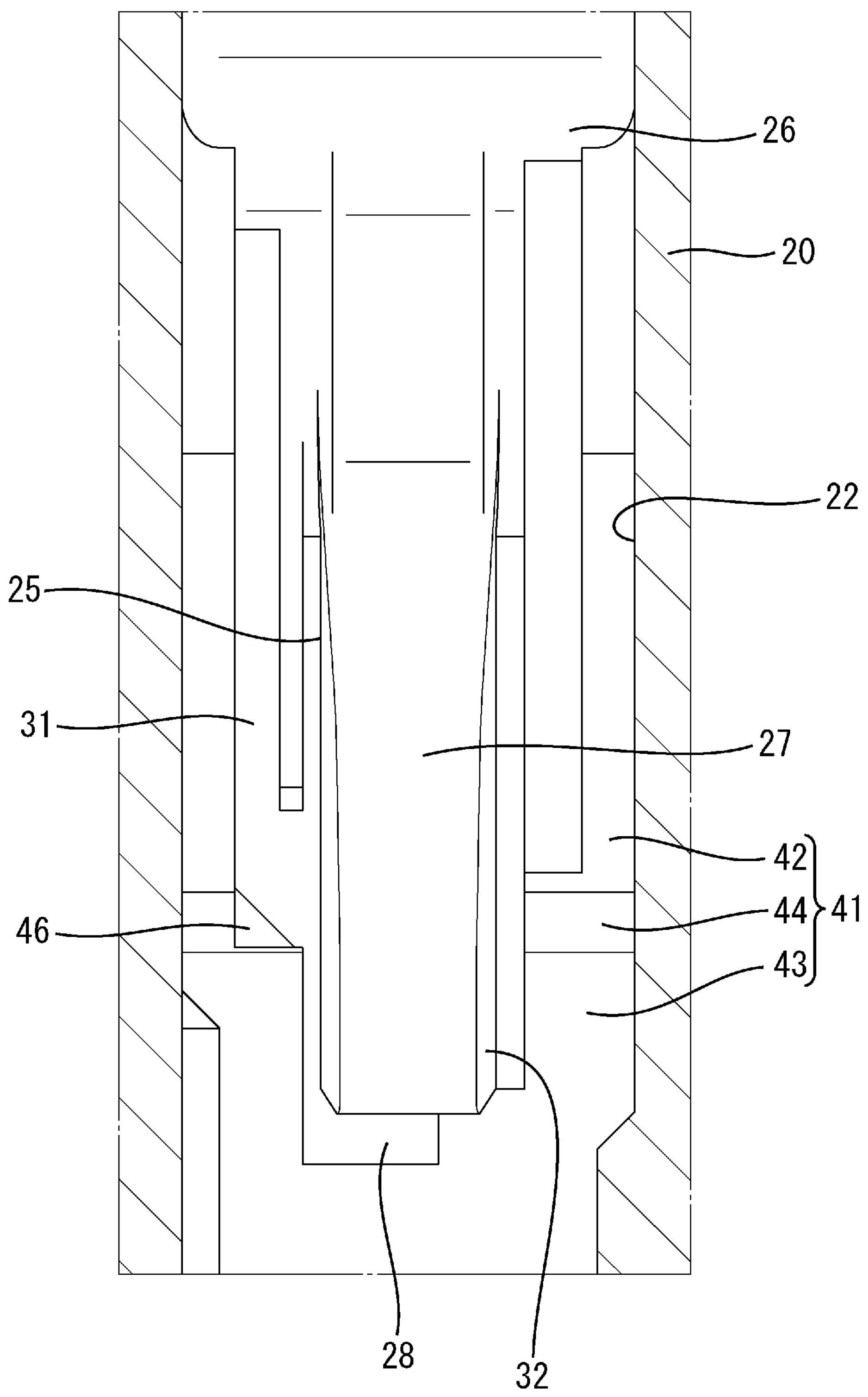
FIG. 3 is a plan view in section enlargedly showing the locking lance projecting into the cavity of the housing.

As shown in FIGS. 3 and 4, the locking lance 25 includes a protruding portion 31 protruding laterally from the left side surface of the extending portion 27. The protruding portion 31 extends in the front-rear direction and a front end side thereof is provided side by side and continuous with the projecting portion 28. An upper corner part of the front end of the protruding portion 31 is obliquely chamfered to provide an inclined portion 46. By pressing the inclined portion 46 of the protruding portion 31 by an unillustrated jig, the locking lance 25 is pushed down and the locking of the terminal fitting 60 by the locking lance 25 can be released. Further, an escaping recess 32 having an L shape in a front view is provided in the right side surface of the extending portion 27. The escaping recess 32 is L-shaped in the front view and has a function of allowing the stabilizer to escape in the process of inserting the terminal fitting 60 into the cavity 22.

As shown in FIGS. 1 and 2, the lower surface of the extending portion 27 serves as a facing surface 33 facing a wall surface part 41 to be described later. The facing surface 33 of the extending portion 27 includes a rear part 34 extending gently and obliquely upward toward a front side. An intermediate part in the front-rear direction of the rear part 34 is somewhat curved or bent downward.

The facing surface 33 of the extending portion 27 includes a recess 36 recessed upward away from the wall surface part 41. The recess 36 includes a corner part 37 at a vertex part on a back side, a rear side part 38 connected behind the corner part 37 and a front side part 39 connected in front of the corner part 37.

Figure 6:
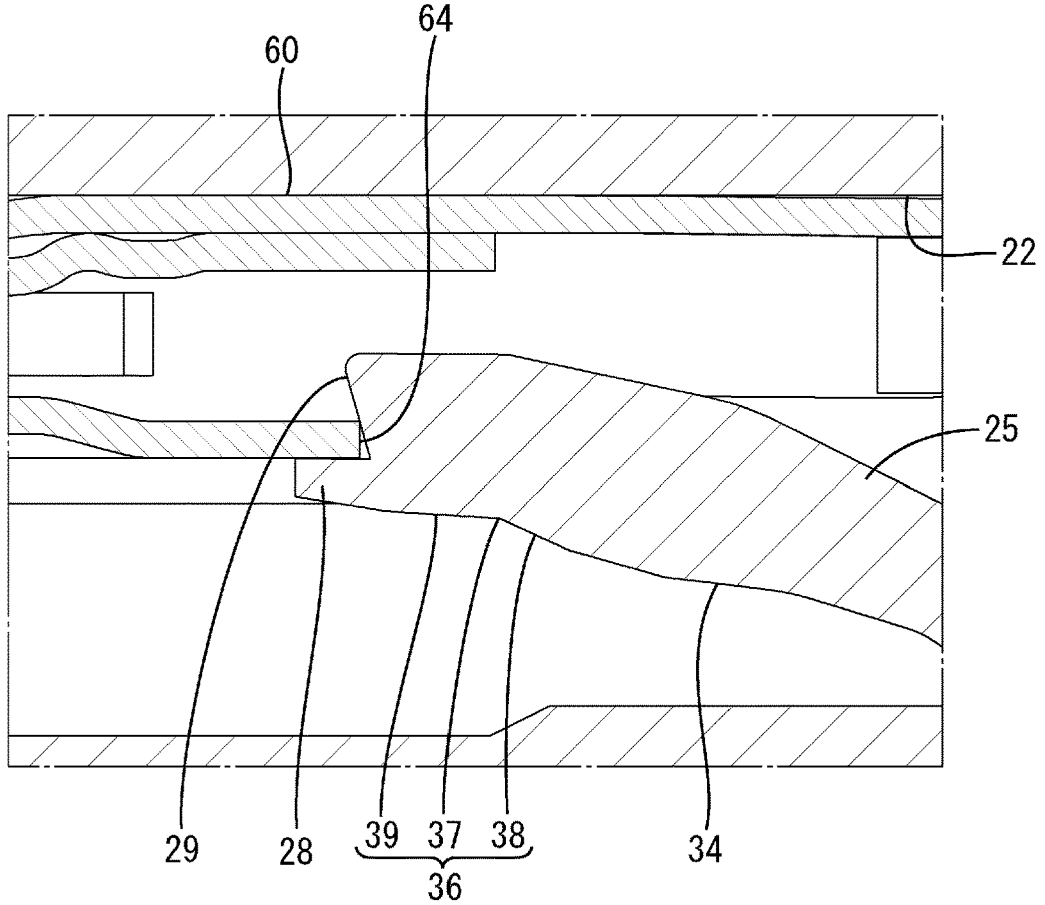
FIG. 6 is a side view in section enlargedly showing a state where the locking lance of the embodiment is deformed in a first deformation mode.
Figure 7:
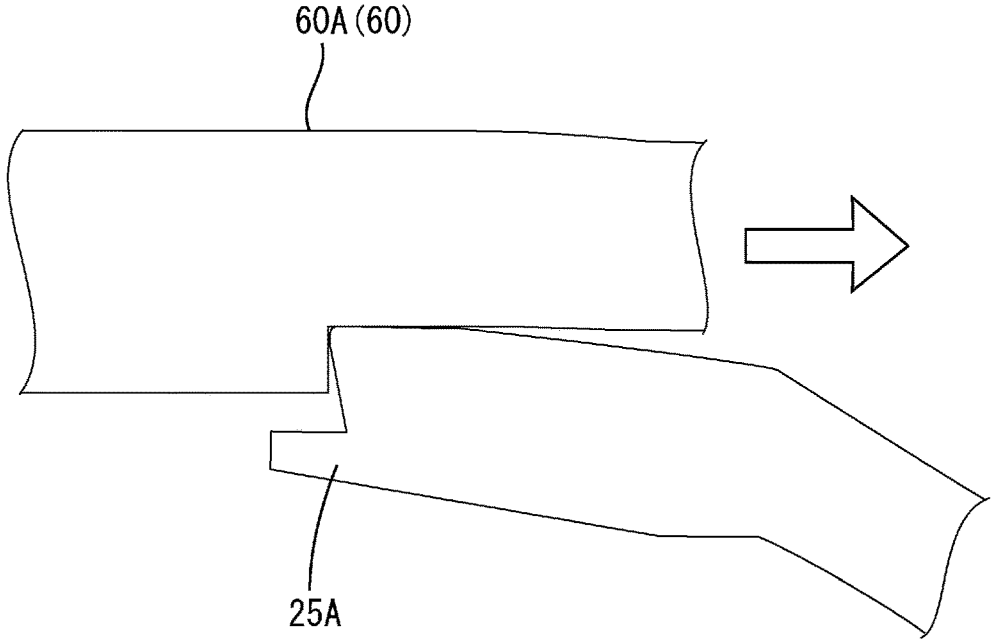
FIG. 7 is a schematic diagram showing a state where a locking lance is deformed in the first deformation mode, as a reference diagram of a conventional art.

As shown in FIG. 4, the corner part 37 linearly extends in the lateral direction over the entire region in the width direction of the extending portion 27, and functions as a deformation inducing portion for inducing such a deformation of the locking lance 25 toward the terminal fitting 60 (hereinafter, referred to as a first deformation mode, see FIG. 6). The rear side part 38 linearly and obliquely extends from the front end of the rear part 34 to the corner part 37 in a side view as shown in FIGS. 1 and 2. The front side part 39 linearly and obliquely extends from the corner part 37 to the lower end of the locking portion 29 in the side view while forming a smaller angle of inclination with respect to the front-rear direction than the rear side part 38. The rear and front side parts 38, 39 are flat surfaces spreading over the entire region in the width direction of the extending portion 27 as shown in FIG. 4. The front end of the front side part 39 includes a part connected to the projecting portion 28.

An inner angle of the corner part 37 of the recess 36 (an opening angle of the recess 36 centered on the corner part 37 when the recess 36 is viewed laterally; see a of FIG. 2) is preferably set in a range of 150° or larger and 170° or smaller, more preferably set in a range of 160° or larger and 170° or smaller. This is for the following reason. It becomes difficult to ensure the strength of the locking lance 25 if the inner angle of the corner part 37 of the recess 36 is smaller than 150°, and it becomes difficult to induce the deformation in the first deformation mode of the locking lance 25 if the inner angle of the corner part 37 of the recess 36 is larger than 170°.

As shown in FIG. 2, the housing 20 includes the wall surface part 41 below the locking lance 25 (in a resilient deformation direction of the locking lance 25 by the terminal fitting 60 in the insertion process into the cavity 22). The wall surface part 41 is arranged to face the facing surface 33 of the locking lance 25 in the vertical direction in a part forward of the base end portion 26 on the inner lower surface of the cavity 22.

Figure 5:
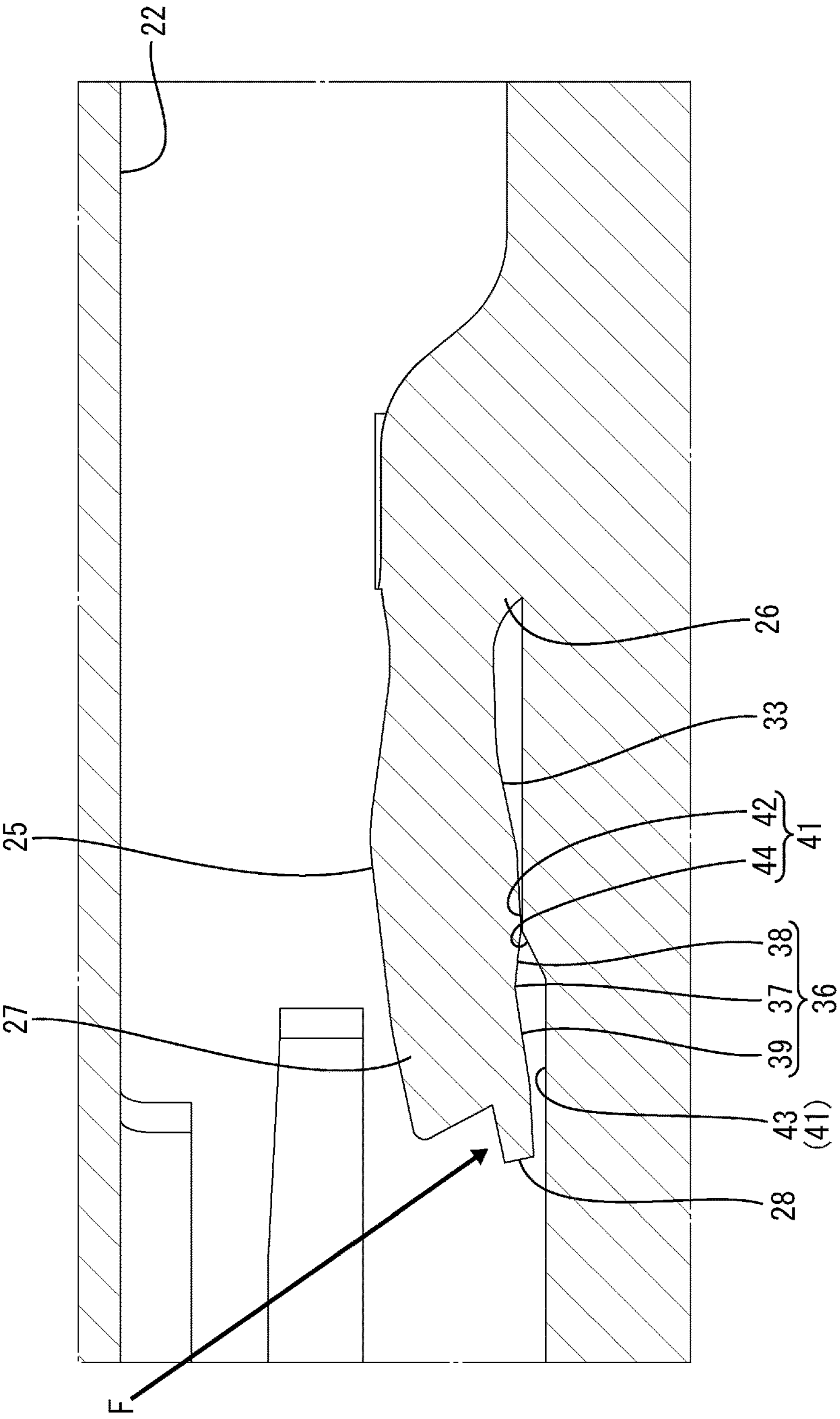
FIG. 5 is a side view in section showing a state where a force for deforming the locking lance is applied and a rear side part of the locking lance is in contact with a base end side wall surface part.

The wall surface part 41 includes a base end side wall surface part 42 facing the rear part 34, which is a rear end side of the locking lance 25, and a tip side wall surface part 43 facing the front side part 39 and the projecting portion 28, which are a front end side of the locking lance 25. The base end side wall surface part 42 and the tip side wall surface part 43 are both arranged to be flat along the front-rear direction and lateral direction. The base end side wall surface part 42 is arranged higher than the tip side wall surface part 43. In other words, the base end side wall surface part 42 is arranged at a position closer to the facing surface 33 of the locking lance 25 than the tip side wall surface part 43. As shown in FIGS. 3 to 5, the wall surface part 41 includes a step surface part 44 inclined downward from the front end of the base end side wall surface part 42 to the rear end of the tip side wall surface part 43.

(Functions of Connector 10)

Before the terminal fitting 60 is inserted into the cavity 22 of the housing 20, the locking lance 25 is maintained in a natural state without being resiliently deformed. An upper end side of the extending portion 27 of the locking lance 25 in the natural state is in an insertion path for the terminal fitting 60 in the cavity 22. In the process of inserting the terminal fitting 60 into the cavity 22, the connecting portion 61 contacts the upper surface of the upper end side of the extending portion 27 and the locking lance 25 is resiliently deformed toward the wall surface part 41. By the contact of the connecting portion 61 with the front wall 23, an inserting operation of the terminal fitting 60 is stopped and the terminal fitting 60 is inserted to a proper depth in the cavity 22 (see FIG. 1). Simultaneously, the locking lance 25 resiliently returns and the locking portion 29 is arranged to be lockable to and face the locked portion 64 from behind. In this way, the terminal fitting 60 is held in a state restricted from coming out rearward from the housing 20.

If the terminal fitting 60 moves rearward in the above state, such as when the wire 90 pulled out from the housing 20 is pulled rearward, the locked portion 64 presses the locking portion 29 and a force for deforming the locking lance 25 is applied. In the case of this embodiment, the corner part 37 serving as the deformation inducing portion is provided in the recess 36 of the locking lance 25. Thus, a bending movement of the locking lance 25 having received the above force to reduce the inner angle of the corner part 37, i.e. a movement of this locking lance 25 from a state before deformation shown in FIG. 1 to a state of deformation in the first deformation mode shown in FIG. 6, is induced. The locking lance 25 deformed in the first deformation mode can bring the projecting portion 28 into strong contact with the lower surface of the connecting portion 61 and be deformed in a direction to increase a locking margin of the locking portion 29 and the locked portion 64. As a result, a holding force of the locking lance 25 for the terminal fitting 60 can be enhanced and any further rearward movement of the terminal fitting 60 can be restricted.

In releasing the locking of the locking lance 25, the unillustrated jig is placed on the protruding portion 31 and the locking lance 25 is pushed down toward the wall surface part 41. In such a case, the locking lance 25 can avoid, for example, a situation of being excessively resiliently deformed by contacting the wall surface part 41. In the case of this embodiment, if a force F is applied from outside or the like and the locking lance 25 is strongly pushed down as shown in FIG. 5, the rear side part 38 of the recess 36 provided at a halfway position in the front-rear direction of the locking lance 25 contacts the base end side wall surface part 42 and excessive resilient deformation of the locking lance 25 is restricted.

In conventional cases, the front end of a locking lance contacted a facing wall surface part to restrict excessive deformation of the locking lance. The wall surface part facing the front end of the locking lance needed to have a predetermined thickness (vertical dimension) to ensure strength to prevent excessive deflection.

In contrast, in the case of this embodiment, strength to prevent excessive deflection is ensured by the base end side wall surface part 42 having the predetermined thickness. Thus, a thickness of the tip side wall surface part 43 facing the front end of the locking lance 25 is smaller than that of the base end side wall surface part 42.

As a result, a height of the housing 20 can be suppressed to be small, which can consequently contribute to the size reduction of the connector 10. Note that the tip of the front side part 39 of the recess 36 and the projecting portion 28 are arranged in contact with or in proximity to the tip side wall surface part 43 with the rear side part 38 of the recess 36 held in contact with the base end side wall surface part 42.

Figure 8:
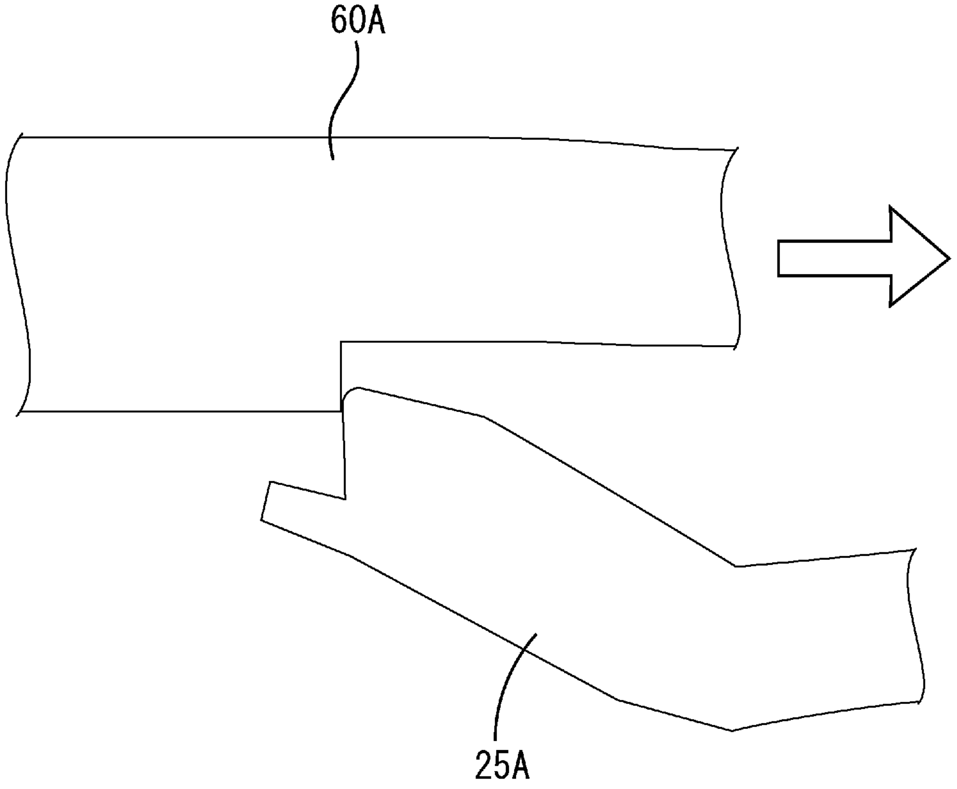
FIG. 8 is a schematic diagram showing a state where the locking lance is deformed in a second deformation mode, as a reference diagram of the conventional art.

As described above, according to this embodiment, when a force for moving the terminal fitting 60 rearward is applied to the terminal fitting 60, the corner part 37 serving as the deformation inducing portion can induce the deformation of the locking lance 25 toward the terminal fitting 60 and the locking lance 25 can strongly contact the terminal fitting 60 to restrict any further deformation. Thus, a rearward movement of the terminal fitting 60 is suppressed. The corner part 37 serving as the deformation inducing portion induces the deformation of the locking lance 25 in the first deformation mode and restricts the deformation of the locking lance 25 in the second deformation mode shown in FIG. 8 in which the locking lance 25A is bent away from the terminal fitting 60A. Thus, it is possible to avoid a situation where the locking lance 25 is deformed in the second deformation mode and the holding force of the locking lance 25 is reduced. As a result, according to this embodiment, the holding force of the locking lance 25 for the terminal fitting 60 can be ensured even if the connector 10 is reduced in size.

The corner part 37 serving as the deformation inducing portion can be easily formed without specially processing the facing surface 33 of the locking lance 25 as a part of the recess 36. Particularly, the corner part 37 is shaped to linearly extend over the entire region in the width direction in the facing surface 33 of the locking lance 25. Thus, reliability in inducing the deformation of the locking lance 25 in the first deformation mode is enhanced.

In the case of this embodiment, the inner angle of the corner part 37 is set to be 150° or larger and 170° or smaller. Thus, the corner part 37 can reliably induce the deformation of the locking lance 25 toward the terminal fitting 60 while ensuring the strength of the locking lance 25.

Further, in the case of this embodiment, the locking lance 25 is structured to restrict excessive resilient deformation thereof by the contact of the rear side part 38 of the locking lance 25 with the base end side wall surface part 42. This can contribute to the size reduction of the connector 10 in the height direction.

OTHER EMBODIMENTS

The embodiment disclosed this time should be considered illustrative in all aspects, rather than restrictive.

In the case of the above embodiment, the corner part of the recess constitutes the deformation inducing portion. In contrast, according to another embodiment, a deformation inducing portion is not particularly limited if being shaped to induce the deformation of a locking lance in the first deformation mode. For example, a cut such as a notch formed in a facing surface of a locking lance may be the deformation inducing portion.

In the case of the above embodiment, the terminal fitting is a female terminal fitting including the tubular connecting portion. In contrast, according to another embodiment, a terminal fitting may be a male terminal fitting including a projecting tab on a front side.

In the case of the above embodiment, the front side part of the recess is arranged at the position connected to the front surface (locking portion) of the extending portion on the facing surface. In contrast, according to another embodiment, a front side part of a recess may be arranged at a position separated from the front surface of an extending portion on a facing surface.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:

a housing including a cavity; and a terminal fitting to be arranged inside the cavity, the housing including a locking lance projecting forward from an inner surface of the cavity, the locking lance being configured to lock the terminal fitting from behind to be able to retain the terminal fitting, and to be resiliently deformable downward toward a wall surface portion of the housing when pressed by the terminal fitting during insertion of the terminal fitting into the cavity, and the locking lance including a deformation inducing portion in a recess of a facing surface facing the wall surface portion, the deformation inducing portion inducing upward bending if a force for moving the terminal fitting rearward is applied, wherein an inner angle of the recess decreases when the force for moving the terminal fitting rearward is applied.

2. The connector of claim 1, wherein:

the deformation inducing portion is shaped to linearly extend in a width direction orthogonal to a resilient deformation direction of the locking lance on a back side of the recess.

3. The connector of claim 2, wherein:

the recess is provided over an entire region in the width direction in the facing surface, and the deformation inducing portion linearly extends over the entire region in the width direction in the facing surface.

4. The connector of claim 2, wherein the inner angle of a corner portion formed on the back side of the recess is 150° or larger and 170° or smaller.

5. The connector of claim 2, wherein:

the wall surface portion includes a tip side wall surface portion facing a front end side of the locking lance and a base end side wall surface portion arranged at a position closer to the facing surface than the tip side wall surface portion and facing a rear end side of the locking lance, the recess includes a corner portion formed on the back side of the recess, a front side portion arranged in front of the corner portion and a rear side portion arranged behind the corner portion, and the base end side wall surface portion is contactable with and facing the rear side portion.

6. The connector of claim 1, wherein the locking lance is configured to:

deform downward toward the wall surface portion when pressed by the terminal fitting during the insertion of the terminal fitting, resiliently return upward away from the wall surface portion when the terminal fitting is in an inserted position, and bend upward toward the terminal fitting by the deformation inducing portion when the force for moving the terminal fitting rearward is applied.

7. The connector of claim 1, wherein the locking lance includes:

a base end portion projecting from the inner lower surface of the cavity;

an extending portion extending forward from the base end portion and including the facing surface on a lower surface of the extending portion; and a projecting portion protruding forward from a lower end of a front surface of the extending portion, wherein the front surface of the extending portion is inclined forward such that an upper end protrudes further forward than the lower end.

* * * * *